United States Patent [19]
Diecke et al.

[11] Patent Number: 5,895,099
[45] Date of Patent: Apr. 20, 1999

[54] HYDRAULIC STRUCTURE FOR A BRAKE SYSTEM

[75] Inventors: Friedrich Konrad Diecke, Knoxville, Tenn.; Christopher Mark Ward, Sycamore, Ill.; Clyde Bennett Stevens, Columbus, Ohio

[73] Assignee: Deere & Company, Moline, Ill.

[21] Appl. No.: 08/953,561

[22] Filed: Oct. 17, 1997

[51] Int. Cl.$^6$ ............................................. B60T 13/74
[52] U.S. Cl. ........................ 303/9.61; 303/3; 303/15; 188/170; 180/306
[58] Field of Search ........................... 303/9.61, 3, 15; 188/170; 180/6.2, 6.48, 305, 306, 307, 308

[56] References Cited

U.S. PATENT DOCUMENTS

| | | | |
|---|---|---|---|
| 4,181,368 | 1/1980 | Strom | 303/15 |
| 4,400,039 | 8/1983 | Ogata | 303/9.61 |
| 4,898,078 | 2/1990 | Gage et al. | 303/9.61 |
| 5,203,616 | 4/1993 | Johnson | 303/10 |

*Primary Examiner*—Lee W. Young
*Assistant Examiner*—Robert Siconolfi

[57] ABSTRACT

A vehicle brake includes a compact module having an inlet port connected to the return-to-sump line of a hydraulic operating system on the vehicle. The module includes a path to a filter mounted on the module for filtering the operating system fluid and a poppet valve for bypassing a clogged filter. Passages in the module direct most of the return line fluid through a poppet valve which develops a source of back pressure substantially lower that system operating pressure in a cavity in the module and returns the fluid to an outlet connected to sump. A portion of the fluid in the cavity is communicated via a charge port in the module to a hydrostatic system to replenish leakage and shuttle flow in the hydrostatic system and to prevent cavitation. The source of back pressure is selectively connected to spring-applied, pressure-released brakes through a four-way solenoid valve housed by the module. To release the brakes, the valve is actuated to direct pressure to one side of each of the brake cylinders. To apply the brakes, the valve is deactuated to pressurize the opposite sides of the cylinders for hydraulically assisted braking.

20 Claims, 2 Drawing Sheets

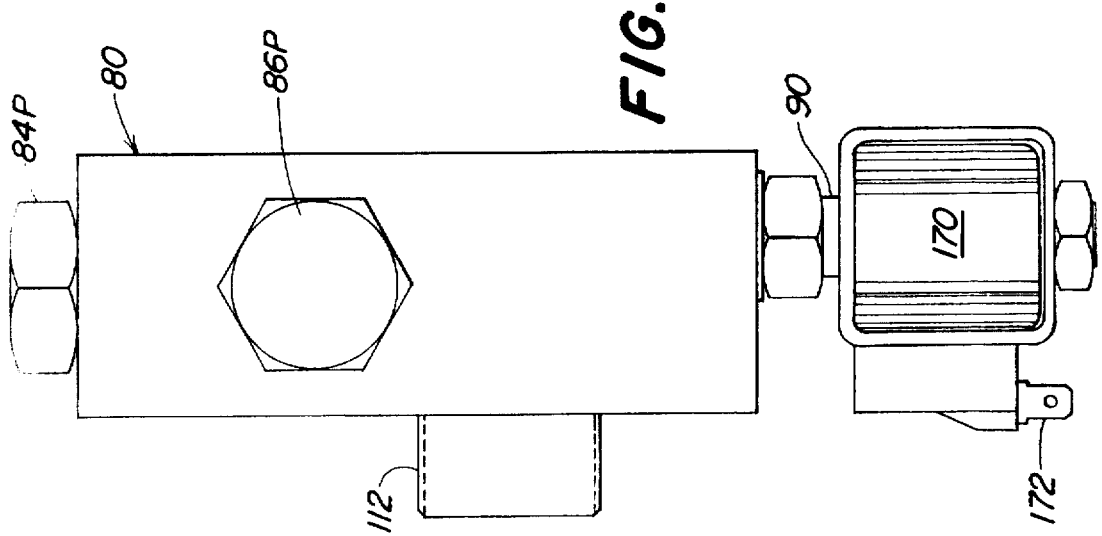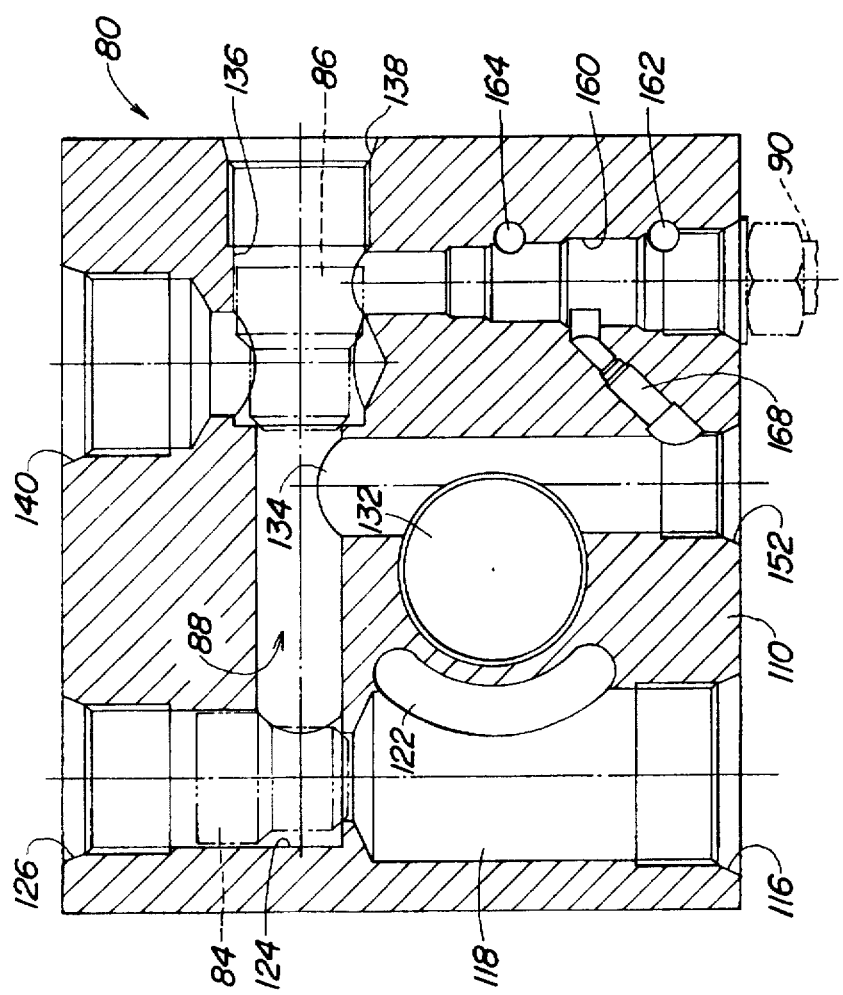

HYDRAULIC STRUCTURE FOR A BRAKE SYSTEM

BACKGROUND OF THE INVENTION

1) Field of the Invention

The present invention relates generally to hydraulic brake control systems and, more specifically, to a hydraulic system for a pressure released brake for a vehicle such as a skid steer loader.

2) Related Art

In braking systems for vehicles, hydraulically controlled brakes are often selectively connected to a source of hydraulic fluid under pressure through a multi-valve system by numerous hydraulic lines. Spring-applied, pressure-released brakes may be used to assure braking if fluid pressure is lost.

In a typical braking system on a vehicle, a relatively large number of brackets and other mounting hardware elements are required to connect the separate lines and valve components, and the system can be complicated and expensive, particularly when individual cartridge valves are utilized. The system often takes up much valuable space in a confined area on the vehicle and is difficult to install. The numerous lines and connections are subject to leakage. Providing a compact and inexpensive braking system that is relatively inexpensive and easily accessible has been a continuing source of problems, particularly in a vehicle such as a skid steer loader where accessible space is at a premium. Providing such a system that effectively utilizes an existing source of hydraulic fluid under high pressure available on the vehicle has also presented problems.

BRIEF SUMMARY OF THE INVENTION

It is therefore an object of the present invention to provide an improved hydraulic brake system for a vehicle. It is a further object to provide such a system that overcomes most or all of the aforementioned problems.

It is a further object of the present invention to provide an improved brake system for a vehicle which is simpler, more compact in construction and easier to install and access in a confined space than many of the previously available systems.

It is yet another object of the invention to provide a brake system which is less subject to leakage than most available systems. It is still another object to provide such a system which has fewer line connections and requires less mounting hardware than most available systems.

It is another object to provide a hydraulic braking system which advantageously utilizes a module to support several components of the system. It is a further object to provide such a system wherein the module includes a hydraulic fluid filter support.

It is a further object of the invention to provide an improved brake system for spring-applied, hydraulically released brakes. It is another object to provide such a system which advantageously utilizes hydraulic system return line flow to provide brake release pressure. It is still another object to provide such a system having a solenoid valve for controlling a spring-applied, hydraulically released brake. It is yet another object to provide such a system which utilizes relatively inexpensive poppet type valves and eliminates need for expensive cartridge valves while still retaining very reliable operating characteristics.

It is another object of the invention to provide such a brake system which utilizes return line flow to reservoir on a working hydraulic system of relatively high operating pressure to provide a source of fluid pressure to establish brake assist pressure substantially below the operating pressure of the working system. It is another object to provide such a system which includes a multi-function module having a system filter support and a charge flow port for replenishing fluid flow to a system pump. It is still another object to provide such a system wherein the module supports an electro-hydraulic valve which provides both brake release and brake assist pressure to the brakes.

A vehicle brake system constructed in accordance with the teachings of the present invention includes a compact module having an inlet port connected to the return-to-sump line of a hydraulic operating system on the vehicle. The module includes a path to a filter mounted on the module for filtering the operating system fluid and a bypass line with a poppet valve for bypassing a clogged filter. Passages in the module direct most of the return line fluid through a poppet valve which develops a source of back pressure on the order of 150 psi to 350 psi in a cavity in the module and returns the fluid to an outlet connected to sump. A portion of the fluid in the cavity is communicated via a charge port in the module to a hydrostatic system to replenish leakage and shuttle flow in the hydrostatic system. The pressurized fluid also charges the low pressure side of the loop to prevent cavitation.

The source of back pressure in the module is selectively connected to spring-applied, pressure-released brakes through a four-way solenoid valve housed by the module. To release the brakes, the valve is actuated to direct pressure to one side of each of the brake cylinders. To apply the brakes, the valve is deactuated to pressurize the opposite sides of the cylinders for hydraulically assisted braking. If the fluid pressure at the module drops or the solenoid fails to operate for any reason, the brakes will automatically be applied by the spring pressure.

The single module construction provides a unified base for a spin-on system filter, the filter by-pass valve, the charge pressure build-up valve, and the spring-applied, hydraulically released brake release and assist circuit. By combining valves performing the separate functions in a single module, the number of bracket and mounting hardware components and the number of hoses or tubes and corresponding connections are reduced for reduced leakage and easier installation and system access. System cost, complexity and size are also reduced compared to most previously available brake systems. The system advantageously utilizes the back pressure developed from the return line of a higher pressure system on the vehicle to provide hydraulic brake assist and release. Expensive cartridge valves are eliminated, and low cost stand-alone poppets can be utilized.

These and other objects, features and advantages of the present invention will become apparent to one skilled in the art upon reading the following detailed description in view of the drawings.

BRIEF DESCRIPTION OF THE DRAWINGS

FIG. 2 is a sectional view of the valve supporting module of the present invention.

FIG. 3 is an end view of the module of FIG. 2.

DETAILED DESCRIPTION OF THE DRAWINGS

Figure 1:
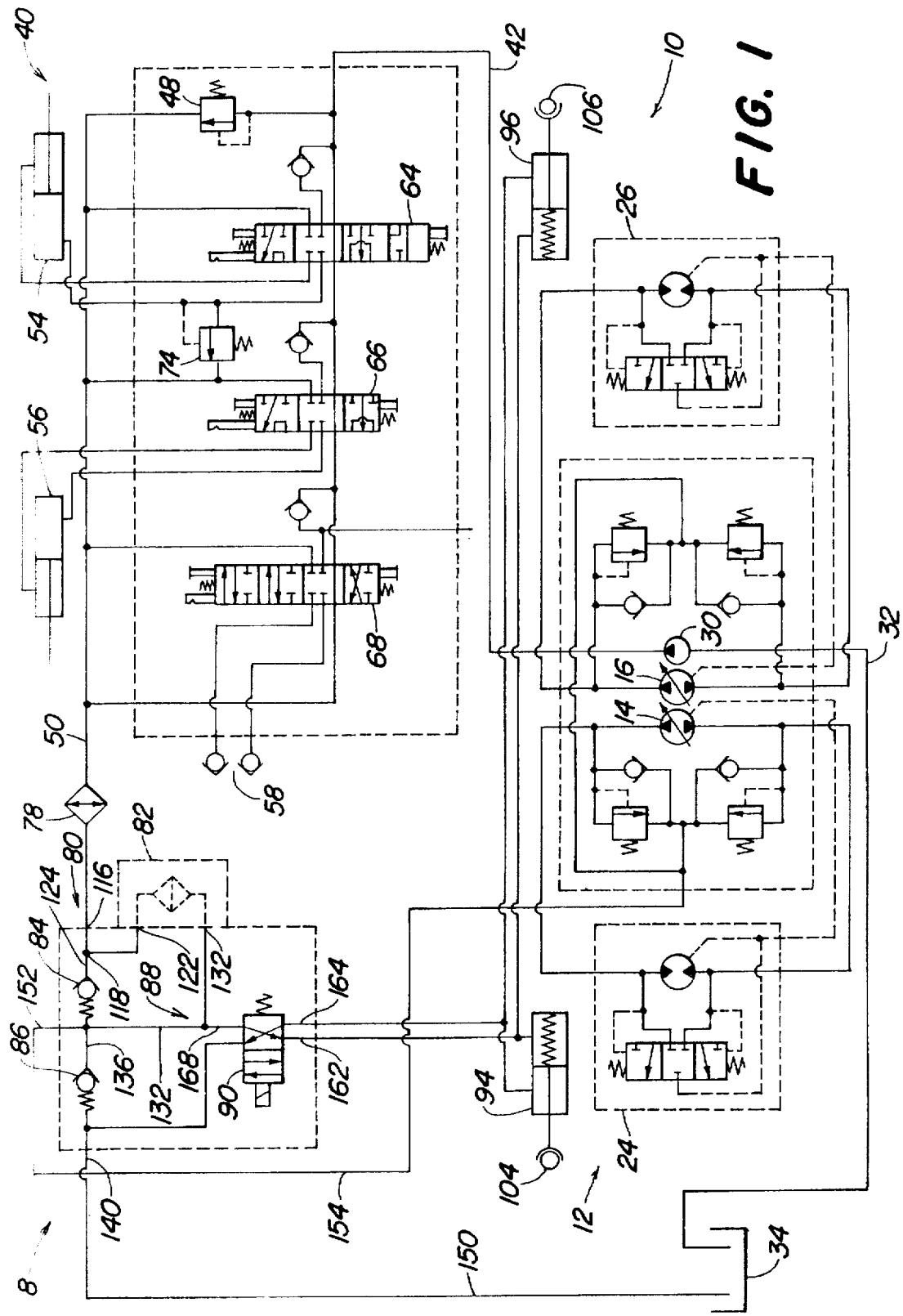
FIG. 1 is a schematic of a hydraulic system for a vehicle which includes spring-applied, pressure released brakes.

Referring now to FIG. 1, therein is shown a schematic for the hydraulic system 8 useful with a vehicle such as a skid steer loader 10 having a conventional hydrostatic drive system 12 with hydraulic loops including engine-driven variable displacement pumps 14 and 16 connected to hydrostatic drives 24 and 26 on the vehicle. A fixed displacement pump 30 having an inlet line 32 connected to a reservoir or sump 34 is also driven by the engine to provide a source of hydraulic fluid under pressure for operating a hydraulic system, indicated generally at 40, on the vehicle. A supply line 42 connects the outlet side of the pump 30 to the inlet side of system 40. A pressure regulating valve 48 connected between the supply line 42 and a return-to-sump line 50 maintains the operating system pressure at a preset maximum level, which, for the system shown in FIG. 1, is on the order of 3000 psi.

The system 40 includes boom cylinders 54 and bucket cylinders 56, as well as an auxiliary output connector 58, connected respectively to hydraulic control valves 64, 66 and 68 for selectively activating the cylinders 54 and 56 and any additional cylinders connected to the auxiliary output connector 58. A pressure relief valve 74 is connected between the base end of the boom cylinders 54 and the return-to-sump line 50 and has a preset release pressure approximately 10 percent above the operating system pressure.

The return-to-sump line 50 is connected through a heat exchanger 78 to a module indicated generally at 80. As seen in FIG. 1, the module 80 supports a spin-on system filter 82, a filter bypass poppet valve 84, a poppet valve 86 providing a source of back pressure at 88 from the return-to-sump line 50. The module also supports an electro-hydraulic two-position, four-way valve 90 selectively connecting the source of back pressure 88 to the apply or release sides of spring-applied, pressure-released brake cylinders 94 and 96 for ground wheel drives 104 and 106 associated with the hydraulic drives 24 and 26, respectively. When the valve 90 is activated, pressure is applied to release the brakes. When the valve 90 is deactivated (in the position shown in FIG. 1), spring pressure aided by any available back pressure at 88 provide a braking force at the drives. The spring-applied brakes assure braking when the engine shuts down or if there is an electric or hydraulic failure.

The module 80 is preferably a unitary structure of rectangular box-like construction having a machined or die-cast body 110 (FIGS. 2 and 3) providing a base 112 (FIG. 3) for the spin-on filter 82. An inlet port 116 at one side of the body 110 provides a path from the return-to-sump line 50 to a cavity 118 which opens to a filter input passageway 122 and to a support chamber 124 for the filter bypass poppet valve 84. A spring chamber plug 84P (FIG. 3) is threaded into the body 110 at location 126 opposite the inlet port 116 to close the end of the chamber 124 and maintains the poppet valve 84 with poppet spring in position within the body. When the filter 82 is unclogged, system hydraulic fluid enters the filter passageway 122, is filtered by the filter 82, and then exits via filter passageway 132 into a central cavity 134. If the filter path is clogged and the pressure at the poppet valve exceeds a preselected differential pressure (preferably on the order of 50 psi), the poppet valve 84 will open to allow fluid to bypass the filter and flow directly from the chamber 118 to the cavity 134.

The back pressure poppet valve 86 is supported within a support chamber 136 which is closed by a plug 86P (FIG. 3) threaded into the side of the module 80 at location 138. Most of the fluid from the return-to-sump line 50 passes over the poppet valve 86 to a tank port 140 connected to the sump 34 by line 150. The poppet valve 86 provides a source of back pressure at 88 substantially less than twenty-five percent of the system pressure, preferably on the order of 150 psi to 350 psi.

A charge port 152 communicates with the cavity 134 and is connected to the hydrostatic system 12 through a line 154 to replenish on demand leakage and shuttle flow in the hydrostatic loop of the system 12. The pressurized fluid also charges the low pressure side of the hydrostatic loop to prevent cavitation.

The electro-hydraulic valve 90 is supported within a solenoid valve cavity 160 having first and second outlet ports 162 and 164 and connected to a passageway 168 supplying pressurized fluid from the central cavity 134. Preferably, the valve 90 is of the type shown and described in U.S. Pat. No. 5,002,253 and includes a solenoid 170 (FIG. 3) having a control input terminal 172 connected to a control line (not shown). When the valve 90 is activated by applying current through the terminal 172, the port 164 is opened to the source of back pressure 88 to urge the brakes cylinders 94 and 96 against the bias of the springs to release the brakes. When the terminal 172 is unpowered, the valve returns to the position shown in FIG. 1, wherein spring pressure and back pressure 88 provide braking force to the brakes.

Having described the preferred embodiment, it will become apparent that various modifications can be made without departing from the scope of the invention as defined in the accompanying claims.

We claim:

1. In a brake system for a vehicle having hydraulically actuated brakes, a primary source of hydraulic fluid under pressure connected to a hydraulic actuator on the vehicle and having a return-to-sump line, a hydraulic system for actuating the brakes comprising:

a pressure valve system connected to the return-to-sump line providing a source of back pressure from said line;

a hydraulic brake actuator control connected to the pressure valve structure and to the hydraulically actuated brakes; and wherein the actuator control is selectively activatable to apply pressure to the brakes from the source of back pressure.

2. The brake system as set forth in claim 1 wherein the hydraulically actuated brakes comprise spring applied, hydraulically released brakes and the brakes are deactuated when the pressure is applied to them.

3. The brake system as set forth in claim 1 wherein the pressure valve system comprises a unitary module housing a directional flow control valve connected to the brake, the module also housing pressure responsive valve structure connected to the return to sump line and providing the back pressure.

4. The brake system as set forth in claim 3 wherein substantially all fluid flow from the source of hydraulic fluid is returned to sump through the unitary module.

5. The brake system as set forth in claim 4 wherein the unitary module includes a filter channel in fluid communication with the return-to-sump line.

6. The brake system as set forth in claim 5 further including a filter bypass valve located in the unitary module.

7. The system as set forth in claim 3 wherein the module includes a charge flow port connected to the source of hydraulic fluid under pressure and to the source of back pressure for providing a replenishing flow of fluid to said source of hydraulic fluid under pressure.

8. The brake system as set forth in claim 5 wherein the module is rectangular configuration with top and bottom surfaces and flat sides connecting the top and bottom surfaces, and wherein the module includes a system filter support having a filter channel receiving substantially all fluid flow from the source of hydraulic fluid.

9. The brake system as set forth in claim 6 wherein the pressure responsive valve structure includes a one way pressure responsive valve connected to the directional control valve and to the return-to-sump line.

10. The brake system as set forth in claim 9 wherein the primary source of hydraulic fluid under pressure provides a preselected operating pressure, and the one way pressure responsive valve provides the back pressure at a pressure substantially less than twenty-five percent of the preselected operating pressure.

11. The brake system as set forth in claim 3 wherein the directional flow control valve comprises an electro-hydraulic valve supported by the module.

12. The brake system as set forth in claim 11 wherein the electro-hydraulic valve has a first state wherein the valve is actuated and the directional control valve applies pressure to the hydraulically actuated brakes to release the brakes and a second state wherein the valve is deactuated so the brakes are applied.

13. The brake system as set forth in claim 12 wherein, when the electro-hydraulic valve is deactuated, hydraulic braking pressure is applied to the brakes.

14. In a brake system for a vehicle having hydraulically actuated brakes, a hydraulic system including a primary source of hydraulic fluid under pressure connected to hydraulic actuator structure on the vehicle and having a return-to-sump line, a hydraulic system for actuating the brakes comprising:

a support module;

a pressure valve system connected to the support module and to the return-to-sump line providing a source of back pressure from said line;

a hydraulic brake actuator control connected to the pressure valve structure and the hydraulically actuated brakes; and wherein the actuator control applies pressure to the brakes from the source of back pressure.

15. The brake system as set forth in claim 14 wherein the actuator control comprises an electro-hydraulic valve having a first state for hydraulically applying braking pressure to the brakes and a second state for hydraulically removing braking pressure from the brakes.

16. The brake system as set forth in claim 15 wherein the brakes comprise spring-actuated brakes which are applied in the absence of hydraulic pressure at the brakes.

17. The brake system as set forth in claim 14 wherein the brake actuator control is supported by the module, and wherein the module includes a filter support adapted for receiving a system filter for filtering substantially all the fluid in the primary source of hydraulic fluid under pressure.

18. The brake system as set forth in claim 17 wherein the hydraulic system includes a hydrostatic loop, and wherein the support module includes a charge flow return port connected to the hydrostatic loop for providing a source of replenishing fluid to the loop from the source of back pressure, wherein the pressurized fluid also helps prevent cavitation in the loop.

19. In a brake system for a vehicle such as a skid steer loader having a hydrostatic loop and hydraulically actuated brakes, a primary source of hydraulic fluid under pressure connected to a hydraulic actuator on the vehicle and having a return-to-sump line, a hydraulic system for actuating the brakes comprising:

a pressure valve connected to the return-to-sump line providing a source of back pressure from said line;

a hydraulic brake actuator control connected to the pressure valve structure and to the hydraulically actuated brakes;

wherein the actuator control is selectively activatable to apply pressure to the brakes from the source of back pressure; and a line connecting the source of back pressure with the hydrostatic loop for recharging fluid in the hydrostatic loop and preventing cavitation.

20. The system as set forth in claim 19 including a module, wherein the pressure valve includes a first poppet valve supported in the module, a filter supported by the module and filtering fluid passing through the return-to-sump line, and a second poppet valve support in the module adjacent the filter for providing a bypass path around the filter when the filter becomes clogged.

* * * * *